United States Patent [19]
Ruch, Jr.

[11] Patent Number: 4,592,672
[45] Date of Patent: Jun. 3, 1986

[54] STRUCTURAL JOINT APPARATUS

[76] Inventor: Asher G. Ruch, Jr., 7648 Harshmanville Rd., Huber Heights, Ohio 45424

[21] Appl. No.: 587,212

[22] Filed: Mar. 7, 1984

[51] Int. Cl.$^4$ ............................................. F16B 9/02
[52] U.S. Cl. .................................... 403/205; 403/231; 403/382; 403/353; 52/657
[58] Field of Search ............... 403/205, 382, 403, 231, 403/353; 52/657, 658; 5/201, 282 R

[56] References Cited

U.S. PATENT DOCUMENTS

| | | | |
|---|---|---|---|
| 1,413,918 | 4/1922 | Lamb | 403/403 X |
| 1,820,206 | 8/1931 | Wilson | 403/231 |
| 2,519,628 | 8/1950 | Bothe | 403/231 X |
| 2,611,460 | 9/1952 | Nash | 403/382 |
| 3,912,407 | 10/1975 | Heininger | 52/657 X |

FOREIGN PATENT DOCUMENTS

| | | | |
|---|---|---|---|
| 1136463 | 9/1962 | Fed. Rep. of Germany | |
| 384449 | 2/1908 | France | 403/205 |
| 2129905 | 5/1984 | United Kingdom | 403/205 |

Primary Examiner—Thomas F. Callaghan
Assistant Examiner—Joseph A. Fischetti
Attorney, Agent, or Firm—John R. Flanagan

[57] ABSTRACT

A substantially rigid structural joint can be assembled from an assembly made up of a pair of separate joinery parts. Each joinery part is preferably in the form of a rigid rectangular-shaped, sheet metal strip. One joinery part has a bracing member connected to and extending outwardly from one of its longitudinal sides in an orthogonal relationship. The bracing member also extends toward and along one of the longitudinal sides of the other joinery part when the latter is placed in an erected condition with the one joinery part. In such condition, they extend in orthogonal relationship to one another and have end portions which form a corner therebetween. Interengagable male and female elements on end portions of the joinery parts adjacent the corner are mated together when the parts are placed in their erected condition. The structural joint is completed when interconnectable elements on a terminal end of the bracing member and on the other joinery part, being located remote from the corner, are rigidly fastened together.

19 Claims, 29 Drawing Figures

STRUCTURAL JOINT APPARATUS

BACKGROUND OF THE INVENTION

1. Field of the Invention

The present invention broadly relates to joining structures together and, more particularly, is concerned with a unique assembly for forming a structural joint which incorporates a bracing member.

2. Description of the Prior Art

Whenever two structures are brought together and fastened into position, a joint is formed. Structural joints of many different designs and constructions exist in the prior art. They are made by a great variety of different methods: some temporary (structures screwed, snapped or clamped together, for example) and others permanent (structures welded, brazed, glued or riveted together, for example).

These different joints have inherent limitations, some in their low degree of strength and others in their lack of relative ease of construction. The temporary types tend to be weaker than the permanent ones, but easier to construct. However, substantially none of the joints made by either general type of method are prefabricated to permit easy and rapid assembly in a predetermined manner.

Consequently, a need exists for a joint construction offering improved ease of assembly without sacrificing its strength. In other words, a joint design is needed which embodies the desirable characteristics of both temporary and permanent joint types—ease of construction and high strength.

SUMMARY OF THE INVENTION

The present invention provides a structural joint assembly designed to satisfy the aforementioned needs. It permits rapid and easy assembling of the joint in a predetermined manner. As an assembled structural joint, it does not depend on gravity to hold it together and has high strength in all directions of stress. It can be manufactured with a high strength to weight ratio because of its efficient handling of the stress and torque loads imposed upon it by the structures to which it is attached. It can also be mass-produced and thereby widely distributed and made available to consumers at a low unit cost, reducing the time and skill otherwise required to make an equivalent structural joint on a customized basis. Furthermore, in some applications, the joint is just as easy to disassemble as to assemble. When attached to parts of a structure or article intended to be assembled for use and then disassembled from time to time to facilitate storage or transfer to other locations, the ease with which the joint components can be disassembled enhances the portability of the structure. Finally, the assembled joint will find practical application in a wide variety of articles and structures, some of which might be furniture, buildings and toys.

Accordingly, the present invention is directed to an assembly capable of being assembled into a substantially rigid joint, which assembly comprises: (a) separate first and second elongated, substantially rigid, legs capable of being placed in an erected condition with respect to one another, the legs having respective corner-forming portions which together form a corner when the legs are placed in the erected condition; (b) interengagable means defined on the respective corner-forming portions of the legs and capable of being disposed in a releasable mated relationship when the legs are placed in their erected condition; (c) a substantially rigid bracing member integrally connected to and extending outwardly from one of the legs, the bracing member extending toward and along the other of the legs so as to form a reinforcing bridge spanning the corner formed by the corner-forming portions of the legs when the latter are placed in their erected condition; and (d) interconnectable means defined on the bracing member and the other of the legs at locations displaced from the corner-forming portions of the legs and displaced from the corner when the legs are placed in the erected condition, the interconnectable means capable of being rigidly fastened together for retaining the legs in their erected condition and the interengagable means in the mated relationship to thereby provide a substantially rigid joint.

DETAILED DESCRIPTION OF THE PREFERRED EMBODIMENTS

Figures 1A, 1B:
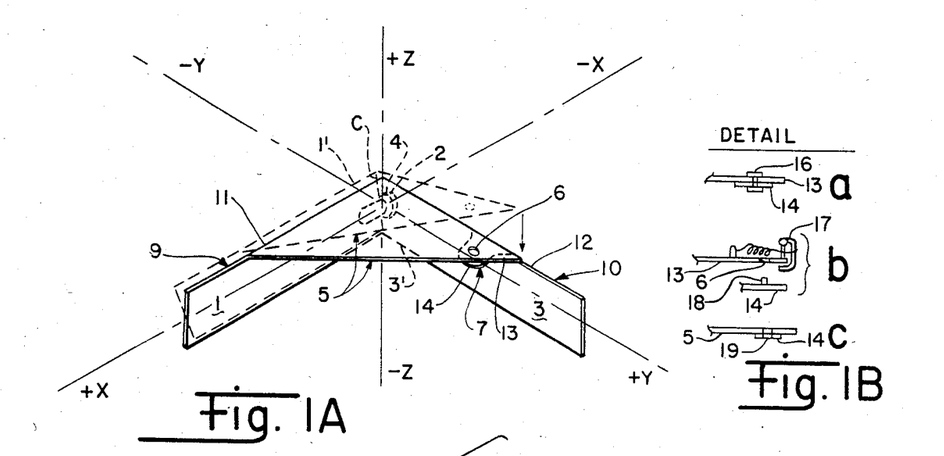
FIG. 1A is an isometric view of a structural joint assembled from separate joinery parts of an assembly incorporating the principles of the present invention.
FIG. 1B includes cross-sectional views of several different possible connections between the joinery parts of the assembly of FIG. 1A.
Figure 27:
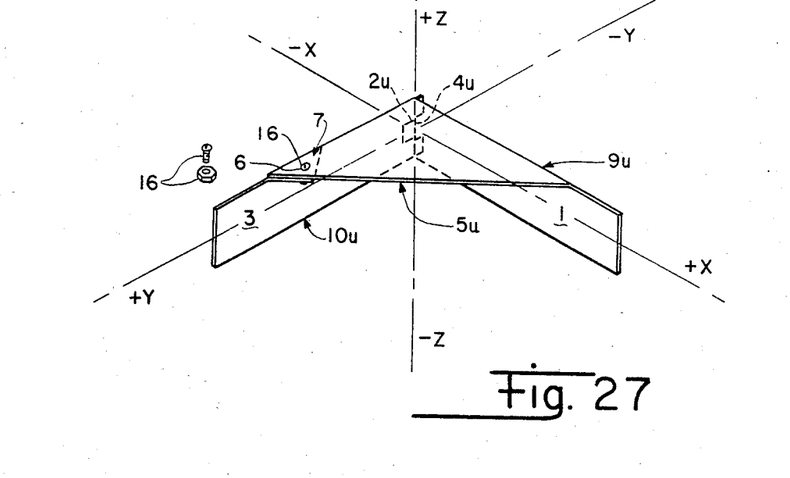

In the following description, all embodiments of the structural joint assembly of the present invention, during both assembling and disassembling thereof, are assumed to be oriented along stationary x, y and z coordinates as depicted in FIGS. 1A and 27. It should be understood that this is only for purposes of descriptive clarity and should not be construed as a limitation on the orientation of the assembly in its intended applications.

Referring now to the drawings, and particularly to FIG. 1A, there is shown a structural joint assembled from an assembly which comprises an exemplary embodiment of the present invention. Basically, the assembly includes a pair of separate legs 1 and 3, a pair of interengagable male and female elements 2 and 4, a bracing member 5, and a pair of interconnectable elements 6 and 7. Leg 1, interengagable element 2, bracing member 5 and interconnectable element 6 form one joinery part 9 of the assembly, while leg 3, interengagable element 4 and interconnectable element 7 form the other journey part 10 of the assembly.

Figures 2, 3, 4, 5:
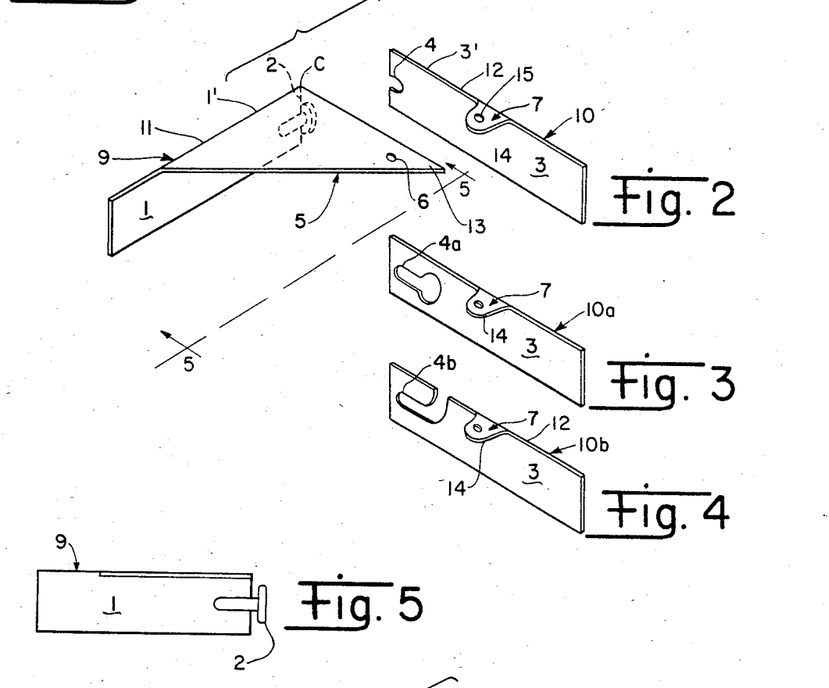
FIG. 2 is an isometric view of the structural joint assembly of FIG. 1A in a disassembled condition.
FIGS. 3 and 4 are views of several alternative embodiments of one of the joinery parts of the joint assembly of FIGS. 1A and 2.
FIG. 5 is a plan view of the other of the joinery parts of the assembly as seen along line 5—5 of FIG. 2.

As will be explained hereinafter, joinery parts 9 and 10, depicted in FIG. 1A along x and y coordinates, respectively, when assembled together can carry loads internally in all directions. The legs 1 and 3 which take the form of elongated, substantially rigid, planar strips, preferably rectangular in configuration and formed from sheet metal, are capable of being placed in an erected condition as seen in FIG. 1A, or a dismantled condition as seen in FIG. 2. In their erected condition, the legs 1 and 3 are preferably disposed in a generally orthogonal relationship to one another.

As the legs are being placed in their erected condition, complementary male and female elements 2 and 4 in the configuration of a hook and a slot, respectively, in FIGS. 1A and 2, are moved along the y coordinate into an interlocked relationship and a corner C is formed by adjacent end portions 1' and 3' of the legs 1 and 3. The interlocking relationship provided by mated male and female elements restrains rotation of leg 1 relative to leg 3 in the xz plane about the y coordinate. With male and female elements 2 and 4 so mated, slight movement of leg 1 and bracing member 5 thereon relative to leg 3 in the xy plane about the z coordinate will complete placement of legs 1 and 3 in their erected condition and assembling of the joint formed thereby when interconnectable elements 6 and 7 defined on the bracing member 5 and leg 3 are aligned with one another and fastened together, as will now be explained.

The bracing member 5 in the form of a substantially rigid, planar strip, preferably triangular in configuration and made from sheet metal also, is connected to a longitudinally-extending side 11 of the one leg 1 and extends outwardly therefrom in a generally orthogonal relationship to the leg. When the legs 1 and 3 are placed in their erected condition, bracing member 5 extends toward the other leg 3 and along a corresponding longitudinally extending side 12 thereof so as to, in effect, provide a reinforcing bridge which spans the corner C formed by the legs 1 and 3.

The interconnectable element 6 on the bracing member 5 is in the form of a hole defined in a terminal end portion 13 of the bracing member 5. The complementary interconnectable element 7 defined on the other leg 3 takes the form of an upstanding tab 14 connected to and extending outwardly from the same longitudinally-extending side 12 of the leg 3, preferably in an orthogonal relationship thereto. Tab 14 overlaps in close side-by-side relationship with the terminal end portion 13 of the bracing member 5 when the legs 1,3 are in their erected condition in which the structural joint is formed by the assembly. A hole 15 in tab 14 is aligned with hole 6 in bracing member 5, and fastening means of a variety of types can be used to rigidly interconnect or fasten the bracing member 5 and tab 14 together at their respective aligned holes 6 and 15.

FIG. 1B illustrates various possible fastening means for making the interconnection between joinery parts 9 and 10 at their respective bracing member 5 and tab 14. For example, connection "a" shows the fastening means to be a bolt 16. Connection "b" shows the fastening means as a spring-biased dog 17 mounted on the end portion 13 of the bracing member 5 which can be actuated to rigidly hold a pin 18 mounted on tab 14 within hole 6 on the end portion 13. Connection "c" represents the fastening means in the form of a rivet or weld 19 rigidly securing tab 14 and bracing member 5 together.

The interconnected relationship provided by the rigidly connected elements 6 and 7 resists movement of the joinery parts 9 and 10 relative to one another along the y coordinate which otherwise might result in unmating of the male and female elements 2 and 4 from one another. Also, any tendency for rotational movement of either leg 1 or 3 about the other is resisted by the rigid interconnected relationship of the bracing member 5 to the other leg 3 and integrally-connected relationship of the bracing member to the one leg 1. As a consequence, the interengagement of the male and female elements 2 and 4 at a location adjacent to the corner C defined by legs 1 and 3, the presence of the integrally-connected bracing member 5 spanning the corner C, and the interconnection of elements 6 and 7 at a location remote from the corner C, all contribute to assemblin of the separate joinery parts 9 and 10 into a substantially rigid structured joint in which the parts are internally restrained from undergoing movement relative to one another along and rotationally about any of the x, y or z coordinates. By such interengaged and interconnected arrangement providing a substantially rigid structure, either joinery part may be viewed as a crank arm serving to transmit a torque to the other joinery part due to some load being imposed thereon, which torque is effectively resisted and accommodated by the rigid structure of the joint.

FIGS. 3 and 4 show modified forms of the interengagable element 4 on leg 3 in FIGS. 1A and 2. In FIG. 3, female interengagable element 4A has a tear-drop configuration with which the enlarged end of hook 2 must be aligned and inserted before being slid along the y coordinate to the left into the interlocking relationship. In FIG. 4, female interengagable elements 4b is in the form of a slot which opens at side 12 of the leg 3. Thus, an arcuate path is defined for movement of the male hook 2 into interlocking relationship with female slot 46. The remainder of each of the joinery parts 10a, 10b in FIGS. 3 and 4 is identical to joinery part 10 in FIGS. 1A and 2.

FIG. 5 merely displays a side profile of male hook 2 on the one leg 1 of the joinery part 9.

Figure 6:
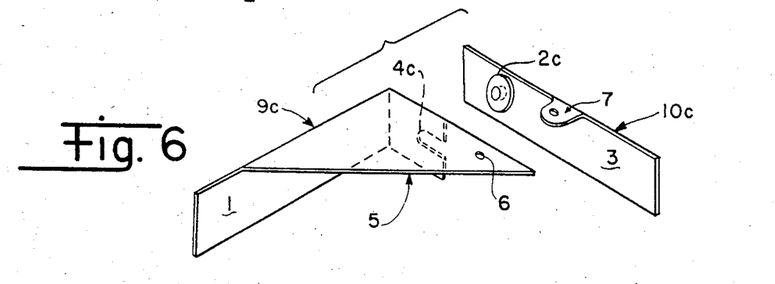
FIGS. 6-9 are isometric views of several modified forms of the structural joint assembly of the present invention, illustrated in disassembled condition.

FIG. 6 illustrates a modified form of the two joinery parts 9 and 10 of FIGS. 1A and 2 wherein joinery part 9c now contains the female interengagable element 4c, while joinery part 10c has the male interengagable element 2c thereon. The rest of the parts 9c, 10c are substantially the same as the one in FIGS. 1A and 2.

Figure 7:
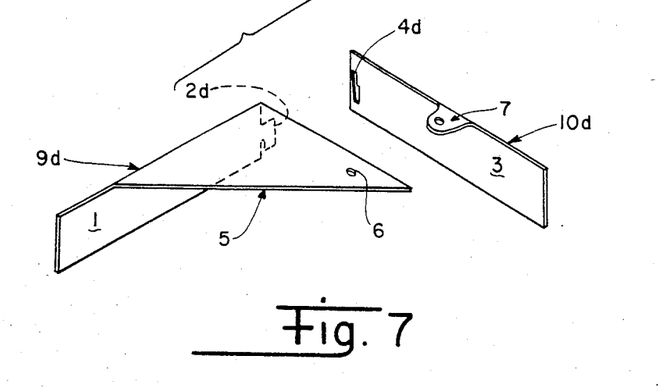
Figure 8:
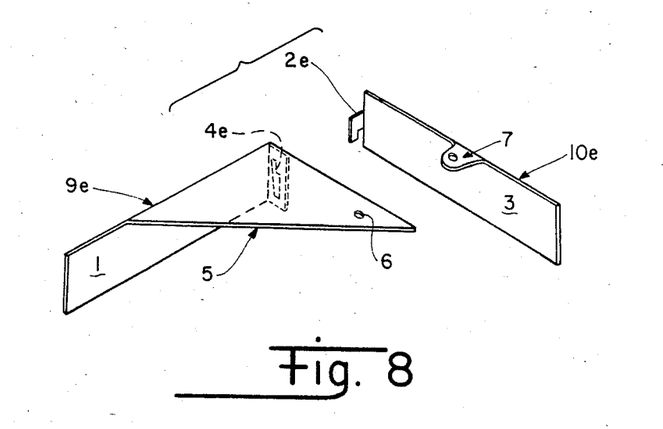

FIG. 7 illustrates joinery part 9d having a hook 2d of a configuration different from that of FIGS. 1A and 2 and joiner part 10d having a slot or recess 4d of a configuration different from that of FIGS. 1A and 2 as well. Joinery part 9d is rotated slightly counterclockwise around the x coordinate (not shown) to align the hook 2d for insertion into slot 4d on joinery part 10d. Once the hook is inserted all the way into the recess, slight rotation of joinery part 9d in a clockwise direction about the x coordinate interlocks the elements 2d, 4d in mated relationship and brings the holes of interconnectable elements 6 and 7 into alignment for fastening parts 9d and 10d together. Once elements 6 and 7 are rigidly fastened together, male and female elements 2d, 4d cannot unmate. FIG. 8 illustrates joinery parts 9e and 10e in which male and female interconnectable elements 2e and 4e substantially identical to those of FIG. 7 are disposed on opposite ones of the parts from that shown in FIG. 7.

Figure 9:
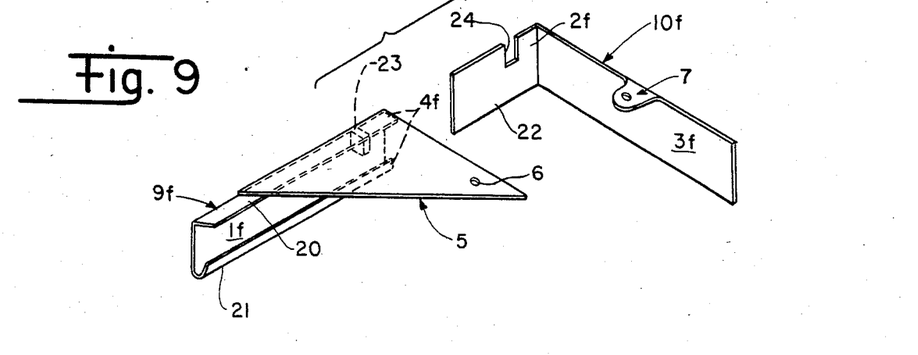
Figure 10:
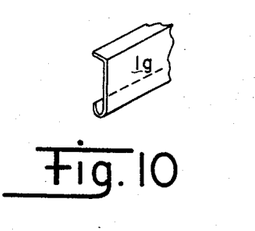
FIGS. 10-12 are fragmentary views of several alternative embodiments of one of the joinery parts of the joint assembly of FIG. 9.
Figure 11:
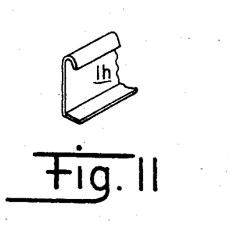
Figure 12:
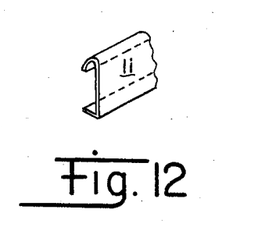

FIG. 9 depicts another modified form of the two joinery parts 9 and 10 of FIGS. 1A and 2. The leg 1f of joinery part 9f, instead of being solely a planar strip, has an upper flange 20 projecting therefrom in the y coordinate direction (or orthogonal relationship) and a lower flange 21 which is bent so as to extend outwardly and upwardly. Both flanges 20 and 21 define a channel therebetween which extends along the x coordinate and forms the female interengagable element 4f. The other joinery part 3f has an axilliary leg 22 which is connected, and extends in orthogonal relationship, to leg 3f and forms the male interengagable element 2f. The latter fits into the channel defined between flanges 20 and 21 by first aligning it with the lower flange 21 at an angle to leg 1f and then rotating it slightly counterclockwise about the x coordinate toward leg 1f. Leg 1f has a projection 23 and auxilliary leg 22 of leg 3f has a receptacle 24 adapted to receive projection 23 when the auxilliary leg 22 is interengaged in the channel formed between flanges 20 and 21. FIGS. 10-12 show variations 1g, 1h and 1i of the leg 1f of the one joinery part 9f of FIG. 9 with regard to modifications in the location of the flanges 20 and 21.

Figure 13:
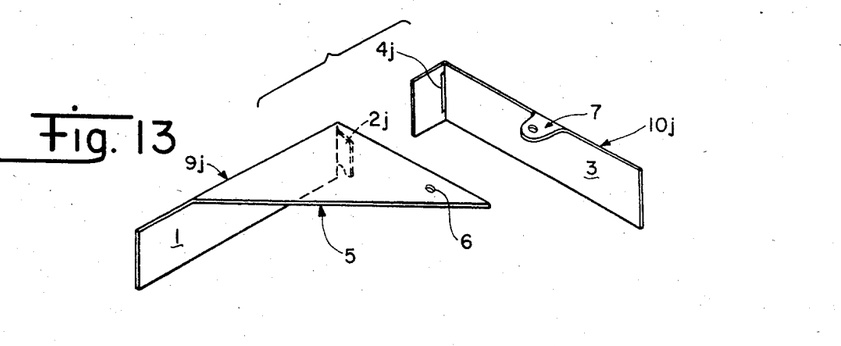
FIGS. 13-14 are isometric views of several more modified forms of the structural joint assembly of the present invention, illustrated in disassembled condition.
Figure 14:
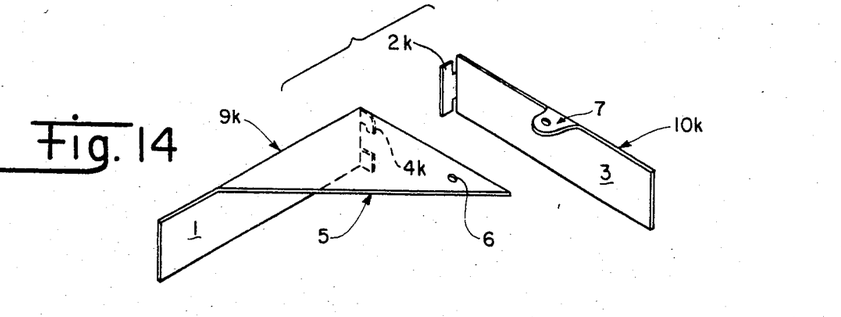

FIGS. 13 and 14 are still other modified forms of the two joinery parts 9 and 10 of FIGS. 1A and 2. These modified forms 9j, 10j and 9k, 10k are slight variations of, but bear the same relationship to one another as, parts 9d, 10d and 9e, 10e of FIGS. 7 and 8, respectively. However, in the form of FIG. 13, hook 2j is hooked in slot 4j along the y coordinate and then part 9j is rotated toward part 10j about the z coordinate to bring the hole 6 in bracing member 5 into alignment with the hole in tab 7. The height of hook 2j is just slightly less than the length of slot 4j (which was also the case with respect to the comparable hook and slot in the embodiments of FIGS. 7 and 8) so that movement of the joinery parts 9j, 10j relative to one another along the z coordinate is restrained when the parts are assembled together. FIG. 14 illustrates a design similar to, but substantially the reverse of the FIG. 13 design with respect to the male and female interengagable elements 2k and 4k.

Figure 15:
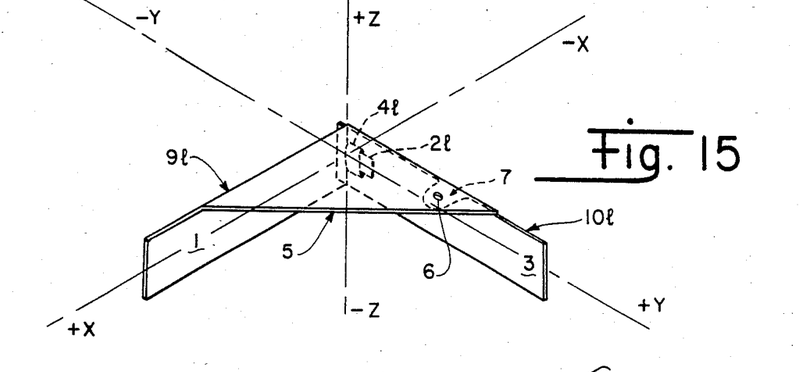
FIG. 15 is an isometric view of yet another modified form of the structural joint assembly of the present invention, illustrated in assembled condition.
Figure 16:
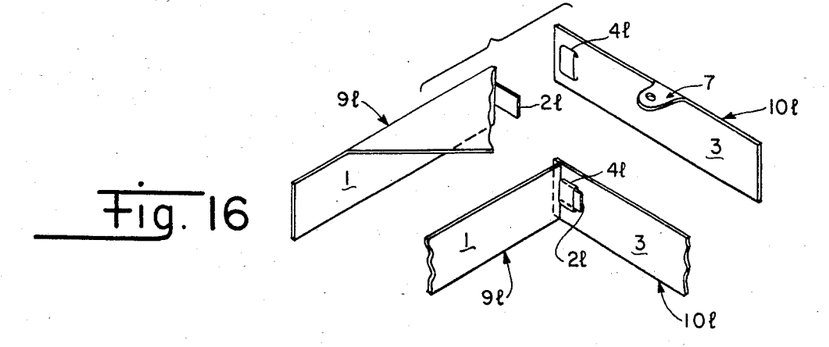
FIG. 16 includes fragmentary isometric views of the structural joint assembly of FIG. 15 in disassembled and assembled conditions.

FIG. 15 shows yet another modified form of the two joinery parts 9 and 10 of FIG. 1A, with the parts 91 and 101 of the assembly assembled together as was the case in FIG. 1A to form a structural joint. In this form, as also seen in FIG. 16, part 91 is assembled by inserting its male projecting element 21 into the female, sleeve-like element 41 of part 101 through moving the parts toward one another along the y coordinate and then slightly rotating the parts toward or away from each other about the z coordinate until the interconnectable elements 6 and 7 are aligned and a fastener secured the elements together.

Figure 17:
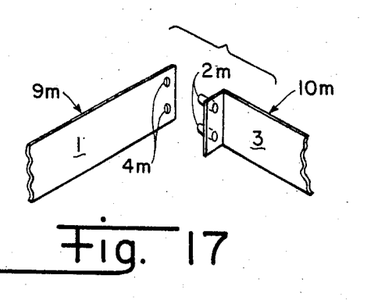
FIGS. 17-24 are fragmentary isometric views of several modified forms of possible mating relationships between the joinery parts of the joint assembly of the present invention.
Figure 18:
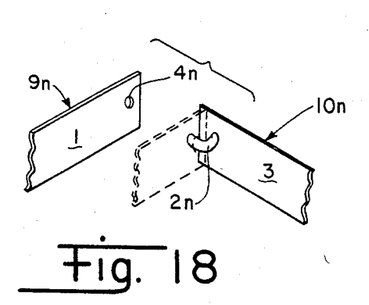
Figure 19:
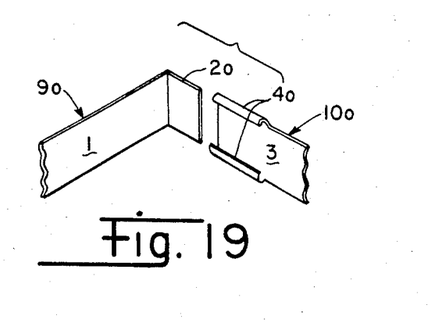
Figure 20:
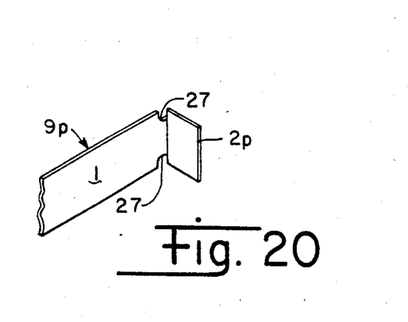
Figure 21:
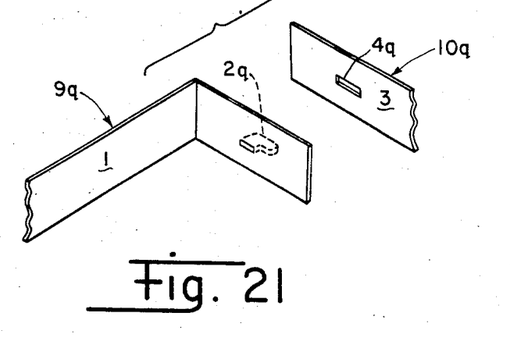
Figure 22:
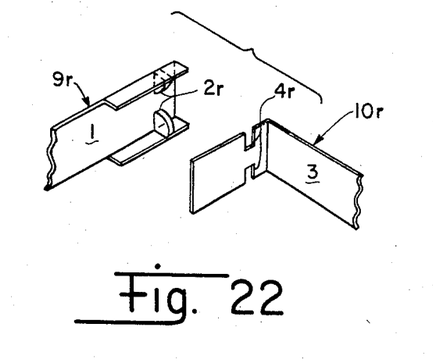
Figure 23:
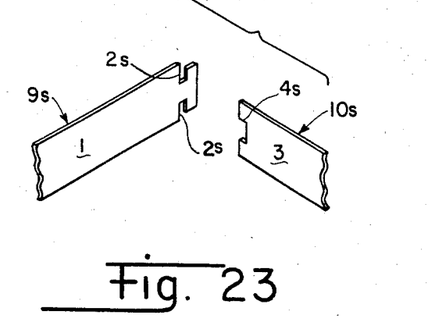
Figure 24:
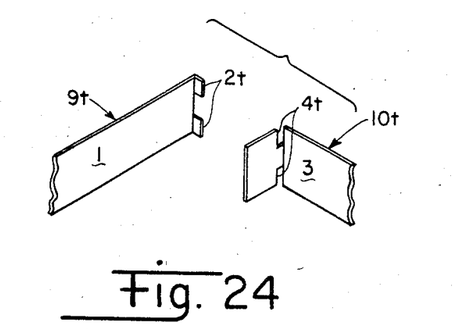

FIGS. 17-24 show more variations in designs for the male and female interengagable elements defined on legs 1 and 3 of the joinery parts. FIG. 17 depicts two pieces (male elements) 2m in joinery part 10m which mate with two holes (female elements) 4m in joinery part 9m. FIG. 18 illustrates a male bent pin 2n in joinery part 10n which mates with a female hole 4n in joinery part 9n. FIG. 19 displays a male tab 2o on joinery part 9o which when moved left to right along the y coordinate inserts between female guides 4o on joinery part 10o. FIG. 20 shows a male tab 2p slotted at the top and bottom at 27 which allows guides 4o to be inserted thereon from the opposite direction along the y coordinate. FIG. 21 shows another hook and slot arrangement for the interengagable elements 2q and 4q of joinery parts 9q and 10q. FIGS. 22-24 show several more variations on projection and slot arrangements 2r, 4r; 2s, 4s and 2t, 4t for the interengagable elements of joinery parts 9r, 10r; 9s, 10s and 9t, 10t.

Figure 25:
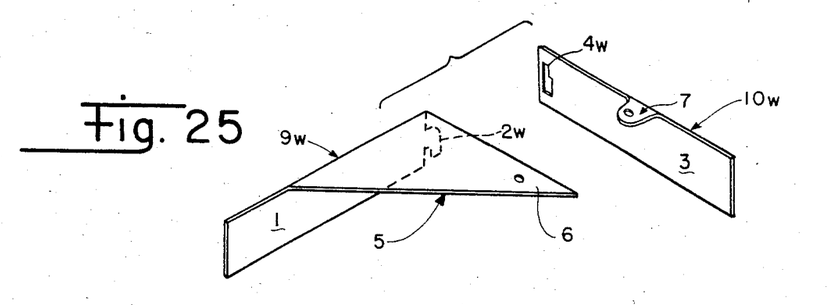
FIG. 25 is an isometric view of the structural joint assembly similar to FIG. 7, but with the slot or recess having a different configuration.
Figure 26:
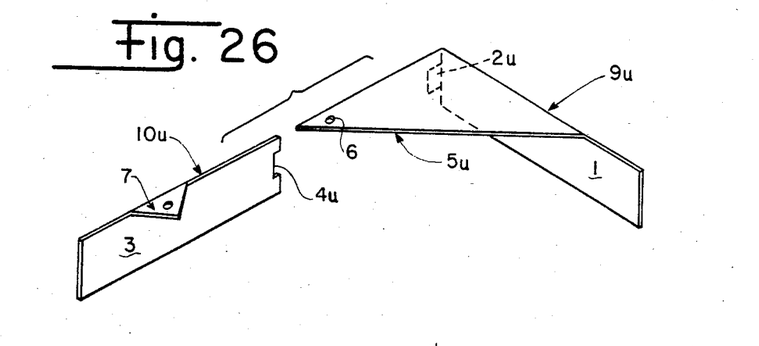
FIGS. 26 and 27 are isometric views of another modified form of the structural joint assembly in disassembled and assembled conditions respectively.
Figure 28:
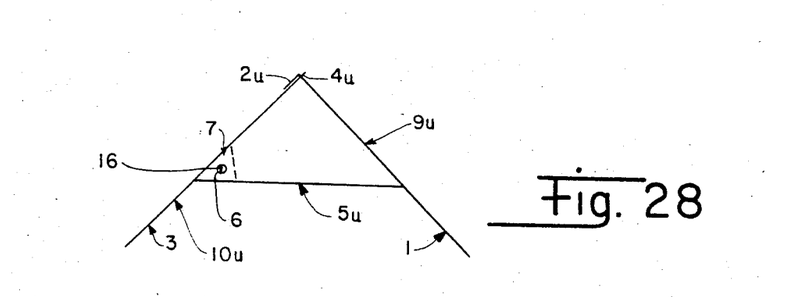
FIG. 28 is a plan view of the structural joint assembly of FIG. 27.

FIG. 25 is another modified form of the joinery parts 9d and 10d of FIG. 7 wherein slot 4w is parallel to the corner. FIGS. 26-28 illustrate a mirror image of the overall arrangement of the assembly to that arrangement illustrated in FIGS. 1A-25. This should make it clear that it makes no difference with respect to the structural joint formed by the assembly whether the bracing member is connected to the left or right one of the legs 1,3.

A leg as used herein refers to one of the branches of a forked or jointed object and an erected condition is one in which two legs are put together to form a structural joint. The reference to two legs having respective end portions which together form a corner when the legs are placed in the erected condition applies to an "L" as well as an "X" or "T" shaped joint, for example, in which the end portions form a corner even though the material of one leg extends beyond the corner to form another leg along its length.

It is also noted that a judicious use of hinges could be employed to enable the disassembled joinery parts to be stored and shipped in a flattened condition. Thus, in FIGS. 15 and 16, element 2 could be orthogonally fastened to leg 1 by a hinge, element 7 orthogonally fastened to leg 3 by a hinge and bracing member 5 orthogonally fastened to leg 1 by a hinge.

It is thought that the assembly of the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. An assembly capable of being assembled into a substantially rigid joint, comprising:
   (a) separate first and second substantially rigid legs capable of being placed in an erected condition with respect to one another, said legs having respective portions which together form a corner when said legs are placed in said erected condition;
   (b) interengagable means defined on said respective corner-forming portions of said legs at locations adjacent to said corner formed by said portions and capable of being disposed in a releasable mated relationship when said legs are placed in said erected condition;
   (c) a substantially rigid bracing member internally connected to and extending outwardly from one of said legs, said bracing member extending toward and along the other of said legs so as to form a reinforcing bridge spanning said corner formed by said corner-forming portions of said legs when the latter are placed in said erected condition; and (d) interconnectable means defined on said bracing member and said other of said legs at locations displaced remote from said corner-forming portions of said legs and displaced remote from said corner when said legs are placed in said erected condition, said interconnectable means capable of being fastened together for retaining said legs in said erected condition and said interengagable means in said mated relationship to thereby provide a substantially rigid joint.

2. The assembly as recited in claim 1, wherein:

said first and second legs are in the form of separate, elongated planar strips disposed in generally orthogonal relationship to one another when placed in their erected condition; and said bracing member is in the form of a planar strip connected to a longitudinally-extending side of said one leg and extending in a generally orthogonal relationship thereto, said bracing member also being disposed in generally orthogonal relationship to said other leg and extending toward and along a corresponding longitudinally-extending side of said other leg so as to span a side of said corner formed by said legs when said legs are placed in their erected condition.

3. The assembly as recited in claim 1, wherein said interengagable means is comprised of a pair of interlocking male and female elements, said male and female elements each being defined on a different one of said legs.

4. The assembly as recited in claim 3, wherein said interlocking male and female elements are in the form of a hook and slot.

5. The assembly as recited in claim 3, wherein said interlocking male and female elements are in the form of a pair of interfitting chanel sections.

6. The assembly as recited in claim 3, wherein said interlocking male and female elements are in the form of a projection and recess.

7. The assembly as recited in claim 3, wherein said interlocking male and female elements are in the form of a pin and hole.

8. The assembly as recited in claim 1, wherein said interconnectable means are in the form of a pair of holes each defined in said bracing member and said other of said legs are aligned with one another when said legs are placed in their erected condition, and a fastening element for rigidly interconnecting said bracing member and said other leg at said holes.

9. The assembly as recited in claim 1, wherein said interconnectable means are in the form of a tab connected to said other leg and extending outwardly therefrom and overlapping with said bracing member when said legs are placed in their erected condition, a pair of holes each defined in said tab and said bracing member where they overlap one another and aligned with each other when said legs are placed in their erected condition, and a fastener interconnecting said tab and said bracing member at their respective aligned holes.

10. The assembly as recited in claim 1, wherein said one leg of said first and second legs is in the form of an elongated planar strip and said planar bracing member is connected to a longitudinally-extending side of said strip and extends outwardly in a generally orthogonal relationship thereto.

11. The assembly as recited in claim 10, wherein one of said interconnectable means is defined on a terminal end of said bracing member.

12. The assembly as recited in claim 10, wherein one of said interengagable means is one of a male or female interlocking element defined adjacent to an end of said strip.

13. The assembly as recited in claim 1, wherein said other leg of said first and second legs is in the form of an elongated planar strip.

14. The assembly as recited in claim 13, wherein one of said interengagable means is one of a male or female interlocking element defined adjacent to an end of said strip.

15. The assembly as recited in claim 13, wherein one of said interconnectable means is in the form of a tab connected to and extending outwardly from said strip in generally orthogonal relationship thereto, and a hole defined in said tab.

16. An assembly capable of being assembled and disassembled into and from a substantially rigid joint, comprising:

(a) separate first and second substantially rigid legs, said legs capable of being placed in, and converted between, an erected condition and a dismantled condition with respect to one another, said legs having respective portions which together form a corner when said legs are placed in said erected condition;

(b) interengagable means defined on said respective corner-forming portions of said legs at locations adjacent to said corner formed by said portions, said interengagable means capable of being disposed in a mated relationship when said legs are placed in said erected condition and converted to an unmated relationship when said legs are converted to said dismantled condition;

(c) a substantially rigid bracing member integrally connected to and extending outwardly from one of said legs, said bracing member extending toward and along the other of said legs so as to form a reinforcing bridge spanning said corner formed by said corner-forming portions of said legs when said legs are placed in said erected condition; and (d) interconnectable means defined on said bracing member and said other of said legs at locations displaced remote from said corner-forming portions of said legs and displaced remote from said corner when said legs are placed in said erected condition, said interconnectable means capable of being fastened together for retaining said legs in said erected condition and said interengagable means in their mated relationship to thereby provide a substantially rigid joint, said interconnectable means further capable of being unfastened from one another to allow conversion of said interengagable means to their unmated relationship and said legs to their dismantled condition to thereby disassemble said joint.

17. The assembly as recited in claim 16, wherein:

said first and second legs are in the form of separate, elongated planar strips disposed in generally orthogonal relationship to one another when placed in their erected condition; and said bracing member is in the form of a planar strip connected to a longitudinally-extending side of said one leg and extending in a generally orthogonal relationship thereto, said bracing member also being disposed in generally orthogonal relationship to said other leg and extending toward and along a corresponding longitudinally-extending side of said other leg so as to span a side of said corner formed by said legs when said legs are placed in their erected condition.

18. The assembly as recited in claim 16, wherein said interengagable means is comprised of a pair of interlocking male and female elements, said male and female elements each being defined on a different one of said legs.

19. The assembly as recited in claim 16, wherein said interconnectable means are in the form of a tab connected to said other leg and extending outwardly therefrom and overlapping with said bracing member when said legs are placed in their erected condition, a pair of holes each defined in said tab and said bracing member where they overlap one another and aligned with each other when said legs are placed in their erected condition, and a fastener interconnecting said tab and said bracing member at their respective aligned holes.

* * * * *

UNITED STATES PATENT AND TRADEMARK OFFICE
CERTIFICATE OF CORRECTION

PATENT NO. : 4,592,672
DATED : June 3, 1986
INVENTOR(S) : Asher G. Ruch, Jr.

It is certified that error appears in the above-identified patent and that said Letters Patent is hereby corrected as shown below:

Column 6, line 66 (Claim 1, line 14), "internally" should be
-- integrally --

Signed and Sealed this

Twenty-third Day of September 1986

[SEAL]

Attest:

DONALD J. QUIGG

Attesting Officer

Commissioner of Patents and Trademarks